(12) United States Patent
Tan et al.

(10) Patent No.: US 9,216,405 B1
(45) Date of Patent: Dec. 22, 2015

(54) ROTARY ENTHALPY EXCHANGE WHEEL HAVING SULFONATED BLOCK COPOLYMER

(71) Applicant: Kraton Polymers U.S. LLC, Houston, TX (US)

(72) Inventors: Kuitian Tan, Katy, TX (US); Steven Huynh, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 2 days.

(21) Appl. No.: 14/316,116

(22) Filed: Jun. 26, 2014

(51) Int. Cl.
| | |
|---|---|
| *B01D 53/02* | (2006.01) |
| *B01J 20/26* | (2006.01) |
| *B01D 69/10* | (2006.01) |
| *B01D 71/80* | (2006.01) |
| *B01D 71/66* | (2006.01) |
| *B01D 53/22* | (2006.01) |
| *B01J 20/10* | (2006.01) |
| *B01J 20/28* | (2006.01) |

(52) U.S. Cl.
CPC .............. *B01J 20/264* (2013.01); *B01D 53/02* (2013.01); *B01D 53/229* (2013.01); *B01D 69/10* (2013.01); *B01D 71/66* (2013.01); *B01D 71/80* (2013.01); *B01J 20/103* (2013.01); *B01J 20/28035* (2013.01); *B01D 2253/108* (2013.01); *B01D 2253/116* (2013.01); *B01D 2257/80* (2013.01); *B01D 2325/12* (2013.01)

(58) Field of Classification Search
CPC .. B01J 20/264; B01J 20/103; B01J 20/28035; B01D 69/10; B01D 71/66; B01D 71/80; B01D 53/02; B01D 53/229; B01D 2325/12; B01D 2257/80; B01D 53/108; B01D 53/116
See application file for complete search history.

(56) References Cited

U.S. PATENT DOCUMENTS

| | | |
|---|---|---|
| 3,450,795 A | 6/1969 | Segall et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |

(Continued)

FOREIGN PATENT DOCUMENTS

| | | |
|---|---|---|
| CA | 716645 | 8/1965 |
| WO | 2008089332 A3 | 7/2008 |

OTHER PUBLICATIONS

U.S. Appl. No. 14/048,522, filed Oct. 8, 2013, Hidajat.

(Continued)

*Primary Examiner* — Christopher P Jones
(74) *Attorney, Agent, or Firm* — Novak Druce Connolly Bove + Quigg LLP; Michael A. Masse

(57) ABSTRACT

A rotary enthalpy exchange wheel having a rotatable wheel with air passageways extending from a front side to a back side for passing air streams therethrough. The wheel has a rigid substrate which is coated or laminated with a desiccant composition having a sulfonated block copolymer. The sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

30 Claims, 6 Drawing Sheets

(56) References Cited

U.S. PATENT DOCUMENTS

| | | | |
|---|---|---|---|
| 3,985,830 | A | 10/1976 | Fetters et al. |
| 4,039,593 | A | 8/1977 | Kamienski et al. |
| 4,107,236 | A | 8/1978 | Naylor et al. |
| 4,391,949 | A | 7/1983 | St. Clair |
| 4,444,953 | A | 4/1984 | St. Clair |
| 4,946,899 | A | 8/1990 | Kennedy et al. |
| 6,391,981 | B1 | 5/2002 | Willis et al. |
| 6,455,651 | B1 | 9/2002 | Willis et al. |
| 6,492,469 | B2 | 12/2002 | Willis et al. |
| 6,515,083 | B2 | 2/2003 | Ozawa et al. |
| 6,699,941 | B1 | 3/2004 | Handlin, Jr. et al. |
| 6,767,976 | B2 | 7/2004 | Hamada et al. |
| 7,169,848 | B2 | 1/2007 | Bening et al. |
| 7,737,224 | B2 | 6/2010 | Willis et al. |
| 7,883,803 | B2 * | 2/2011 | McElroy ............ H01M 8/04156 429/410 |
| 8,012,539 | B2 | 9/2011 | Handlin, Jr. et al. |
| 2003/0162067 | A1 * | 8/2003 | McElroy ............ H01M 8/04022 429/414 |
| 2009/0280255 | A1 * | 11/2009 | Handlin, Jr. ............ C08F 6/006 427/358 |
| 2010/0203783 | A1 * | 8/2010 | Willis .................... B01D 71/80 442/59 |
| 2012/0073791 | A1 * | 3/2012 | Dubois ................ B01D 53/228 D53/228 |
| 2013/0108880 | A1 * | 5/2013 | Tan ...................... B32B 38/164 428/461 |
| 2013/0240438 | A1 * | 9/2013 | Willis ...................... C08F 8/36 210/500.41 |
| 2014/0251910 | A1 * | 9/2014 | Watters ................... C02F 9/005 210/652 |

OTHER PUBLICATIONS

G.W. Coates, P.D. Hustad, and S. Reinartz in Angew. Chem. Int. Ed., 41, 2236-2257 (2002).

H. Zhang and K. Nomura (J. Am. Chem. Soc., Comm., 2005).

C.J. Hawker, A.W. Bosman, and E. Harth, Chem. Rev., 101(12), 3661-3688 (2001).

\* cited by examiner

ROTARY ENTHALPY EXCHANGE WHEEL HAVING SULFONATED BLOCK COPOLYMER

FIELD OF THE INVENTION

The present disclosure relates to rotary enthalpy exchange wheels. In particular, the present disclosure is directed to rotary exchange wheels having a plastic or aluminum substrate bonded with a desiccant or desiccants mixture which comprises or consists of a sulfonated block copolymer. The sulfonated block copolymer has at least two polymer end blocks that contain little or no sulfonic acid or sulfonate functionality and at least one polymer interior block which contains an effective amount of sulfonic acid or sulfonate functionality. The sulfonated block copolymer can be admixed with other desiccants.

BACKGROUND OF THE INVENTION

Heating, ventilating, and air conditioning (HVAC) systems have been employed in residential, commercial, and industrial building and structures to help control the indoor environment, conserve energy and to maintain healthy and comfortable conditions. One system that has been employed is rotary enthalpy exchange wheels. In such a system, indoor and outdoor air streams are fed to an enthalpy wheel to exchange heat and/or moisture between such air streams without substantial intermixture. Rotary enthalpy wheels exchange both sensible and/or latent heat between air streams in an effort to conserve energy. The transmission of sensible energy involves a change in temperature, whereas latent energy involves the change in energy during a phase transition of a substance. In the context of rotary exchange wheels, latent heat exchange is represented by a change in moisture content between air streams.

A significant portion of energy cost savings can involve the conservation of latent energy. Accordingly, improving the efficiency and effectiveness of latent energy exchange can have a significant impact on improving energy conservation. Rotary enthalpy exchange wheels have generally been employed in large industrial settings due to their ability to handle large airflows. Such systems generally involve a central rotatable wheel having a core capable of receiving cross flowing air streams.

BRIEF DESCRIPTION OF THE DRAWINGS

Implementations of the present technology will now be described, by way of example only, with reference to the attached figures, wherein.

DETAILED DESCRIPTION OF THE INVENTION

Figure 1:
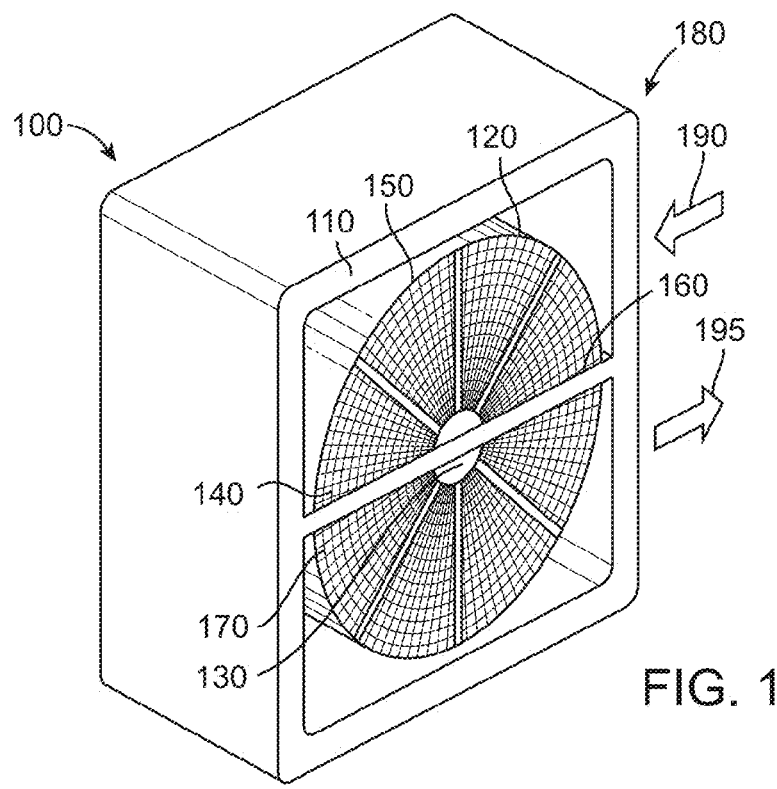
FIG. 1 is a perspective view of one embodiment of a rotary enthalpy exchange wheel.

A detailed description of embodiments of the present disclosure is provided herein; however, it is to be understood that the disclosed embodiments are merely exemplary, and that the disclosure may be embodied in various and alternative forms. Therefore, specific structural and functional details which are addressed in the embodiments disclosed herein are not to be interpreted as limiting, but merely as a basis for the claims and as a representative basis for teaching one skilled in the art to employ the present disclosure.

All publications, patent applications, and patents mentioned herein are incorporated by reference in their entirety. In the event of conflict, the present specification, including definitions, is intended to control.

Unless specifically stated otherwise, all technical terms used herein have the meaning as commonly understood by those skilled in the art.

Moreover, unless specifically stated otherwise, the following expressions as used herein are understood to have the following meanings.

Unless specifically stated otherwise, the expression "coated" or "coating" means the application or bonding of a polymer, in solution or liquid form, to a substrate or other material.

In contrast to "coated," unless specifically stated otherwise, the expression "lamination" means the application or bonding of a cast polymer membrane or polymer film to a substrate or other material.

The term "bonded," or "bonding" encompasses attachment of a polymer to a substrate or other material either by coating or lamination or other means, whereby a bond is formed between a polymer membrane and the substrate or other material.

The expression "water uptake" as used herein refers to the weight of water which is adsorbed by a desiccant, membrane or block copolymer as compared to the original weight of the dry material and is calculated as a percentage.

It will be understood by those skilled in the art that the term "film" herein may also be referred to as a membrane which may be moisture permeable but air impermeable.

The present disclosure relates to a rotary enthalpy exchange wheel which includes a rotatable wheel having air passageways extending from a front side to a back side for passing air streams therethrough. The wheel has a rigid plastic, metal, composite substrate or other substrate material. The rigid substrate is coated or laminated with a desiccant composition comprising a sulfonated block copolymer. The sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

In some embodiments, the desiccant composition is made up solely of the sulfonated block copolymer, or alternatively includes the sulfonated block copolymer as the sole desiccant. In other embodiments, the desiccant composition is a mixture of the sulfonated block copolymer and an additional desiccant, for example desiccants other than the sulfonated block copolymer such as other polymeric desiccants, organic desiccants, inorganic desiccants, zeolites, molecular sieves, or silica gel. When the composition is a mixture of more than one desiccant, the composition can be mixed in solution form prior to coating or lamination or otherwise formed into a membrane.

The rotary enthalpy wheel disclosed herein, employing the desiccant composition comprising the sulfonated block copolymer, demonstrates unexpected and advantageous results for enthalpy exchange between air streams in an enthalpy wheel exchange system. In particular, the desiccant composition comprising the sulfonated block copolymer is capable of rapidly adsorbing and desorbing moisture or water vapor from air.

For example, the desiccant composition disclosed herein can adsorb a larger amount of water in a shorter amount of time than conventional desiccants. This permits greater exchange of moisture between air streams passing through a rotary enthalpy exchange wheel. The desiccant composition can be bonded, via coating or lamination, to a variety of substrates including metal, aluminum, plastic, or a composite plastic material such as fiberglass.

Exemplary Rotary Exchange Wheel Structure.

An exemplary rotary enthalpy exchange wheel 100 is illustrated for example in FIG. 1. As shown therein is a support frame 110 which contains and provides support for wheel 120 therein. The frame 110 can be made up of any strong rigid material such as aluminum or steel, or a strong plastic. The frame 110 supports the wheel 120 without interfering with the rotation therein. The wheel 120 can also be supported on a hub 130. The hub 130 can provide a point around which the wheel 120 rotates. The hub 130 can include a rod extending through the center of the wheel 120 to support and rotate the wheel 120. The hub 130 can be powered to rotate the wheel 120 with any type of motor for providing torque, for example electric motors.

The wheel 120 is made up of or contains a moisture adsorbing matrix 140. The illustrated wheel 120 can have a circular shape, but additionally, can take any other shape as well, for example, square or rectangular, pentagonal, hexagonal, heptagonal, octagonal, or any other number of sides in a polygon, or take any other shape. The wheel 120 can itself have an outer rim 150 to provide support frame portion on its outer circumferential surface and can be made up of the same material as frame 110. In other embodiments no outer rim 150 is present. When present however, wheel frame members 160 can extend from the center to the outer rim 150 of the wheel or to frame 110.

Figure 2:
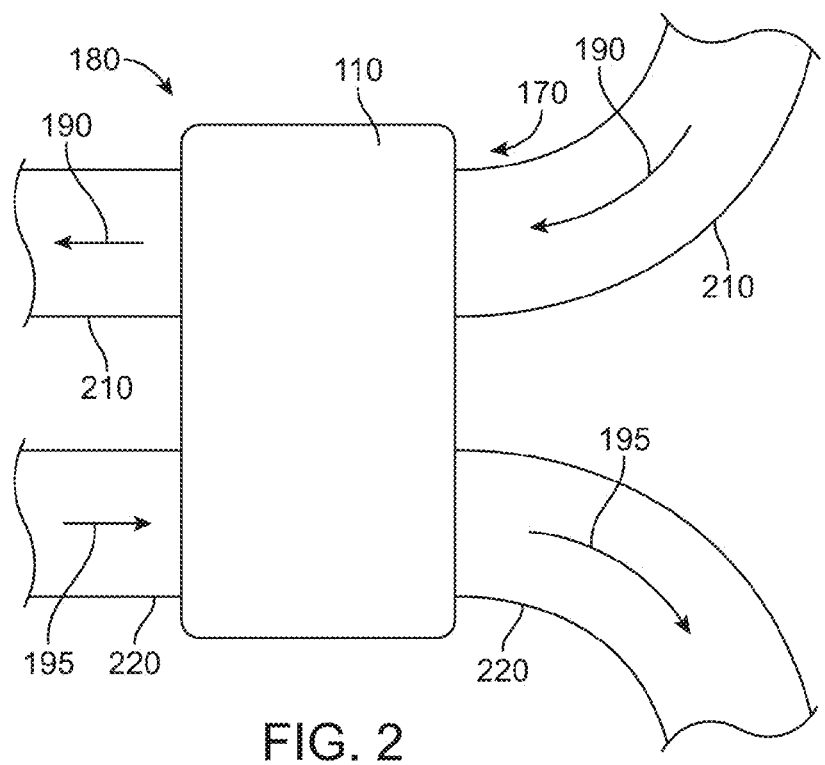
FIG. 2 is a side view illustration of air streams passing through rotary enthalpy exchange wheel.

The wheel 120 moisture adsorbing/desorbing matrix 140 has a front side face 170 and a back side face 180 opposite front face 170. The moisture adsorbing matrix 140 has passageways extending from the front side face 170 to the back side face. The passageways permit air streams to pass through the wheel 120 from one face to the other. For example, exiting air stream 190 can be passed through the top portion of the wheel 120 while the entering air stream 195 can pass through the bottom portion. For example, as shown in FIG. 2, there can be an exit vent system 210 providing the exiting air stream 190 and an entrance vent system 220 for providing the entering air stream 195. As rotary exchange units can be employed with buildings or enclosures, generally, the exiting air stream will be warmer and have higher moisture content, while the entering air stream will be cooler and at lower moisture content. With rotation of the wheel 120, the moisture adsorbing matrix 140 can, for example, sorb moisture from the exiting air stream 190, and release such moisture in the entering air stream 195. By exchanging moisture and heat between air streams, energy can be conserved by increasing the temperature and moisture of the incoming airstream. In other embodiments, the reverse can be true, the entering air stream is warmer with higher moisture content, and the exiting air is cooler with lower moisture content.

In FIG. 1, the moisture adsorbing matrix 140 is made up of a substrate with a desiccant composition made up solely of a sulfonated block copolymer, or sulfonated block copolymer as the sole desiccant, or a mixture of the sulfonated block copolymer and another desiccant other than the sulfonated block copolymer. Accordingly, the substrate provides the mechanical strength as well as the surface for bonding of the desiccant composition thereon.

Figure 3A:
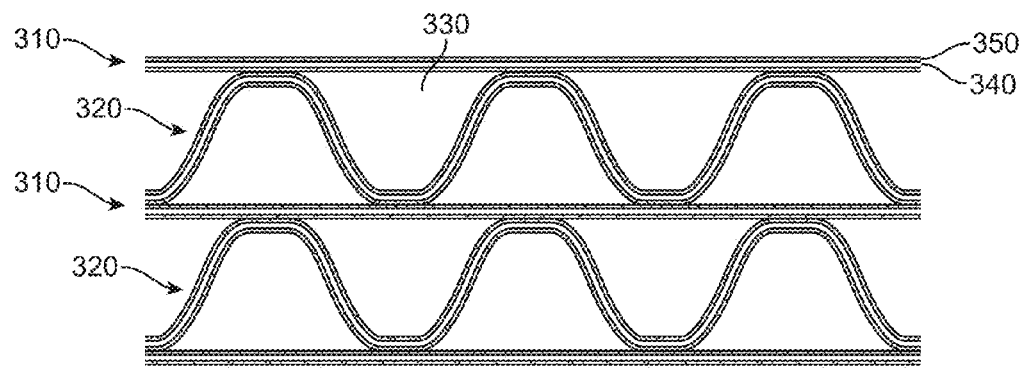
FIG. 3A is a sectional view of one embodiment of a moisture adsorbing matrix for a rotary enthalpy exchange wheel.
Figure 3B:
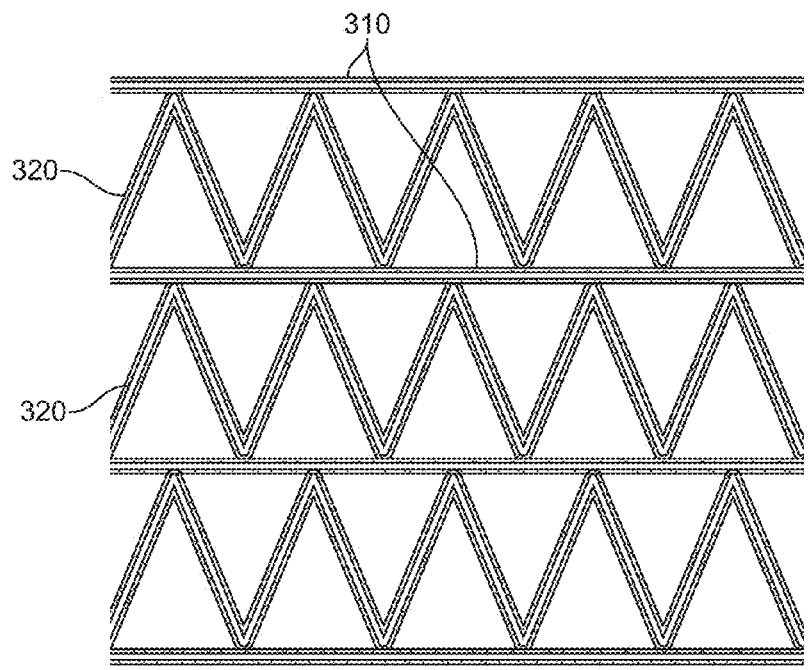
FIG. 3B is a sectional view of one embodiment of a moisture adsorbing matrix for a rotary enthalpy exchange wheel.

A shown in FIGS. 3A and 3B, the moisture adsorbing matrix 140 can have a corrugated shape. For example, in FIG. 3A, there can be horizontal layers 310 with wave layers 320. Air streams can pass through the air passages 330 of wheel 120, passing from the front face and out the back face. By corrugating the layers greater surface area of the moisture adsorbing matrix 140 can be exposed to the air streams and therefore provide greater area for adsorption and desorption. Another triangular configuration is shown for example in FIG. 3B.

The moisture adsorbing material of wheel 120 can be made up of a substrate 340 which provides mechanical strength and rigidity. A desiccant composition 350 is bonded to the substrate 340 for example by coating or lamination. The desiccant composition 350 can be layered across the entire exposed substrate 340 surface, on both sides of the wave layers 320 or horizontal layers 310.

As will be further described below, the substrate can be made up of a variety of materials, including metal and or plastic. The substrate is predominantly rigid and maintains shape in a variety of temperatures and humidities. In some embodiments, the substrate is made up of metal such as aluminum, or a metal alloy having aluminum. In other embodiments, other metals can be used such as steel, stainless steel, copper, tin, and gold.

The substrate can also be made up of a plastic such as polystyrene (PS), polyethylene (PE), polypropylene (PP), polyvinyl chloride (PVC), carbon, fiberglass, cellulose, cellulose nitrate, cellulose acetate, nylon, polytetrafluoroethylene, Nomex®, Kevlar® or a mixture or composite of such materials.

Desiccants

The desiccant composition can be made up solely of a sulfonated block copolymer, or alternatively with the sulfonated block copolymer as the sole desiccant, or a mixture of the sulfonated block copolymer and desiccants other than the sulfonated block copolymer. The sulfonated block copolymers have advantageous properties such as rapid adsorption and de-sorption of moisture from air streams. The sulfonated block copolymer can also have higher water uptake values than conventional rotary wheel moisture adsorbent materials. Generally, with higher water uptake values, dimensional stability can be impaired. However, by providing the sulfonated block copolymer on a substrate, mechanical strength is provided by the substrate thus resolving problems related to dimensional stability. As a result, higher sulfonation levels can be employed with less concern for dimensional stability, thereby providing higher water uptake values. As a consequence, rapid transfer of high amounts of moisture between air streams achieved relative conventional materials.

In some embodiments, the compositions of the present disclosure include the sulfonated block copolymers described in U.S. Pat. No. 7,737,224 to Willis et al. Furthermore, the sulfonated block copolymers, including those described in U.S. Pat. No. 7,737,224, may be prepared according to the process of WO 2008/089332 to Dado et al. or the process of U.S. Pat. No. 8,012,539 to Handlin, Jr. et al.

In preparation of the sulfonated block copolymers herein, initially the block copolymer is formed, then subjected to sulfonation. The sulfonated block copolymers can then be coated onto the substrate for the rotary wheel, or cast to membrane and laminated to a substrate.

Sulfonated Block Copolymers

The block copolymers needed to prepare the sulfonated block copolymers may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

1. Polymer Structure

In one embodiment, the block copolymers have at least two polymer ends or outer blocks A and at least one saturated polymer interior block B wherein each A block is a polymer block which is resistant to sulfonation and each B block is a polymer block which is susceptible to sulfonation.

Preferred block copolymer structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$ or mixtures thereof, where n is an integer from 2 to about 30, X is coupling agent residue and A, B and D are as defined hereinafter.

Most preferred structures are linear structures such as A-B-A, $(A-B)_2X$, A-B-D-B-A, $(A-B-D)_2X$, A-D-B-D-A, and $(A-D-B)_2X$ and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al., as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared by via a Ziegler-Natta process, as taught in the references in the above-cited review article by G. W. Coates et al. Preferably, the alpha-olefins are propylene, butylene, hexene or octene, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester. Examples of the anionic polymerizable monomer that can be optionally used include methacrylic or acrylic monomers such as trimethylsilyl methacrylate, N-,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-di-isopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mole percentages even if the specific combination and range is not listed herewith.

The B blocks, in each case, comprise segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a partially or completely hydrogenated copolymer of such monomer(s) with a conjugated diene selected from 1,3-butadiene, isoprene and mixtures thereof, having a vinyl content of between 20 and 80 mol percent. These copolymers with partially or completely hydrogenated dienes may be random copolymers, tapered copolymers, block copolymers or controlled distribution copolymers. In one preferred embodiment, the B blocks are selectively partially or completely hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. U.S. Pat. No. 7,169,848 also discloses the preparation of sulfonated block copolymers. The B blocks comprising a styrene block are described herein. In a preferred embodiment, the B blocks are made up of unsubstituted styrene and will not require a separate hydrogenation step.

In another aspect of the present disclosure, the block copolymer includes at least one impact modifier block D having a glass transition temperature less than 20° C. The D block is not crystalline, but is instead semi-crystalline or amorphous. Accordingly, while the A block provides a "hard" phase, the D block provides a "softer" block thereby adding a more elastomeric segment. Accordingly, in one embodiment, the impact modifier block D comprises a hydrogenated polymer or copolymer of a conjugated diene selected from isoprene, 1,3-butadiene and mixtures thereof. The butadiene portion of the polymer block having a vinyl content prior to hydrogenation of between 20 and 80 mol percent and the polymer block having a number average molecular weight of between 1,000 and 50,000. In another embodiment, the impact modifier block D comprises an acrylate or silicone polymer having a number average molecular weight of 1,000 to 50,000. In still another embodiment, the impact modifier block D is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mole percentages even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mole percentages even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mole percentages even if the specific combination and range is not listed herewith. The level of sulfonation is determined by titration of a dry polymer sample, which has been re-dissolved in tetrahydrofuran with a standardized solution of NaOH in a mixed alcohol and water solvent.

2. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms, make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present disclosure include the initial monomers noted above. Other important starting materials for anionic copolymerizations include one or more polymerization initiators. In the present disclosure suitable initiators include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, the disclosure of which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and U.S. Re. 27,145, the disclosure of each of which is incorporated herein by reference.

Polymerization conditions to prepare the block copolymers of the present disclosure are typically similar to those used for anionic polymerizations in general. The polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably under nitrogen or argon, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents is known in the art and can be used in preparing the block copolymers. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, the disclosure of each of which is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

3. Process to Prepare Hydrogenated Block Copolymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670, 054, U.S. Pat. No. 3,700,633, and U.S. Re. 27,145, the disclosure of each of which is incorporated herein by reference. These methods operate to hydrogenate polymers containing ethylenic unsaturation and are based upon operation of a suitable catalyst. Such a catalyst, or catalyst precursor, preferably comprises a Group 8 to 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90% of the conjugated diene double bonds are reduced, and between zero and 10% of the arene double bonds are reduced. Preferred ranges are at least about 95% of the conjugated diene double bonds reduced, and more preferably about 98% of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen and nitrogen. Care must be exercised in this step to avoid formation of an explosive mixture of oxygen and hydrocarbons.

4. Process to Make Sulfonated Polymers

According to the multiple embodiments disclosed herein, the above prepared block copolymers are sulfonated to obtain a sulfonated polymer product that is in solution. The block copolymers can be provided in particular organic solvents so as to form micelles prior or subsequent sulfonation.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks which, in turn, are swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core, while the outer sulfonation resistant blocks form a shell which is solvated by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

Micelles can be formed as a result of the sulfonation process, or alternatively, the block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in U.S. Pat. No. 7,737,224.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

(i) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates allow the sulfonation of the polymer to proceed essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

(ii) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted depends upon the composition of the starting polymer, since the limiting concentration below which polymer gelling is non-disabling or negligible depends upon the polymer composition. As stated above, the limiting concentration may also be dependent on other factors such as the identity of the solvent or the solvent mixture used and the desired degree of sulfonation. Generally, the polymer concentration falls within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mole percentages even if the specific combination and range is not listed herewith.

In accordance with some embodiments of the presently described technology, the initial concentration of the precursor block polymer or mixture of precursor block polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified %-wt. even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymer(s) in the reaction mixture may be above the limiting concentration of the precursor polymer.

(iii) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

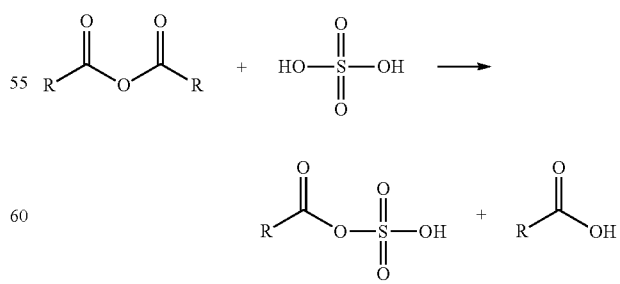

Acyl sulfates are subject to slow decomposition during the course of sulfonation reactions forming alpha-sulfonated carboxylic acids of the following formula:

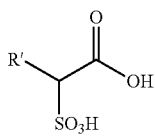

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. It will be understood by those skilled in the art that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

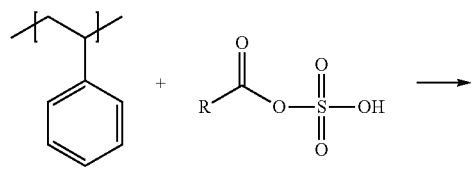

-continued

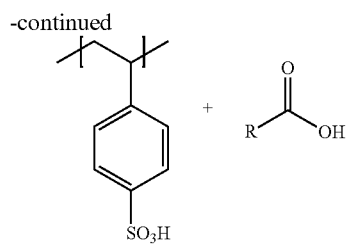

The acyl sulfate reagent that may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mole percentage of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mole percentages even if the specific combination and range is not listed herewith.

The level or degree of sulfonation of a sulfonated polymer can be measured by NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been re-dissolved in tetrahydrofuran with a standardized solution of NaOH in a mixture of alcohol and water. In the latter case, rigorous removal of acid by-products are preferably ensured.

Although embodiments for sulfonating polymers are described above in the context of acyl sulfate reagents, the utility of other sulfonation reagents are also contemplated. For example, the use of those sulfonation reagents derived from complexing/reacting sulfur trioxides and phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphorous pentoxide, polyphosphoric acid, 1,4-dioxane, triethylamine, etc.

(iv) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 hour to about 2 hours, alternatively about 1 hour to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely solvable by a non-halogenated aliphatic solvent, for example the first solvent disclosed above. On the other hand, the sulfonated polymer block(s) may arrange to concentrate in the core of micelle.

(v) Film or Membrane Casting

Once the sulfonation reaction is completed, the block copolymers can be cast directly into a membrane without the necessity of isolating the block copolymer.

Conventional methods may be used for casting the polymer to form a film. One method used may be referred to as solution casting. According to this procedure, the sulfonated copolymer solution obtained from the sulfonation reaction as described above may be poured onto an inert substrate such as a siliconized glass plate. Excess solution can be removed with a glass rod. The remaining solution is then allowed to dry completely until the solvent has been evaporated thereby leaving a cast film of the sulfonated copolymer.

Alternatively to casting, the sulfonated block copolymer can be worked up to separate the sulfonated block copolymer from the reaction mixture and formed into particles or pellets. Such a process for separating the sulfonated block copolymer from the reaction solvent and other impurities is disclosed for example in U.S. application Ser. No. 14/048,522, filed Oct. 8, 2013, to Kraton Polymers U.S. LLC, which is incorporated herein by reference.

Desiccants Other than the Sulfonated Block Copolymer

Desiccants other than the sulfonated block copolymer can be employed and admixed with the sulfonated block copolymer to form a desiccant composition. Desiccants include hygroscopic materials capable of adsorbing water from the air either by absorption, adsorption or other mechanisms. Desiccants include for example inorganic desiccants, organic, polymeric, molecular sieves, zeolites, as well as other materials including, silica gel, activated alumina, activated carbon, calcium chloride, zinc chloride, and lithium chloride.

Molecular sieves are microporous crystalline materials interlaced with regularly spaced channels of molecular dimensions. The pore channels permit adsorption or entrance of molecules smaller than the pore sizes. In some examples, molecular sieves can have pore sizes from 1 to 50 angstrom (Å), or from 3 to 10 Å (or, 13×). Molecular sieves are capable of capturing water molecules into its pores and thereby acting as a desiccant for use in a rotary enthalpy exchange wheel.

One type of molecular sieve includes zeolites. Zeolites are hydrated silicates of aluminum and sodium, potassium, and/or calcium forming three dimensional structures. Such zeolites can have, for example, the formula $Na_2.Al_2O_3.xSiO_2.yH_2O$, where x and y are any number value. Zeolites can be natural or synthetic. Naturally occurring zeolites include chabazite, clinoptilolite, thomosonite, heulandite, faujasite, permutite, analcite, erionite, natrolite, stilbite, phillipsite and mordenite. Natural zeolites which have a sufficiently narrow pore size distribution to act as a molecular sieve can be employed. Synthetic zeolites known in the art can be employed herein, as well as newly developed zeolites. Synthetic zeolites can include zeolites A, D, L, R, S, T, X and Y for example, with types A and X being commonly commercially available. The zeolites can have a majority of the pore sizes of about 2 to 10 Å, or 3 to 8 Å, 4 to 5 Å, or different combinations of such pore sizes can employed. The zeolite pore size is sized to receive water molecules therein.

Additionally, the zeolite can have greater capacity to preferentially adsorb polar molecules.

Silica gel can also be used as a desiccant for adsorbing moisture from air streams. Silica gel has a high surface area and can have pore sizes from 5 to 3000 Å. In some embodiments, the silica gel can have a narrower pore size distribution, for example from 5 to 60 Å, alternatively, 5 to 30 Å, alternatively 5 to 20 Å, or different combinations of such pore sizes can be employed. Silica gel can be provided as a pellet, powder or granulized form, and can be natural or synthetically produced.

Other adsorbing materials can also be employed. For example as mentioned, carbon or alumina can be employed, including activated carbon and activated alumina. These are not particularly limited except that they are capable of sorbing and desorbing water from air streams.

Mixture of Sulfonated Block Copolymer with Other Desiccants

The sulfonated block copolymer described herein can be blended with the other desiccants noted above to form a desiccant composition. The desiccants can be added to the sulfonated block copolymer prior to casting. For example, the desiccants can be added to the sulfonated block copolymer in its original sulfonation reaction solution. Alternatively, the sulfonated block copolymer if in solid form can be re-dissolved by applying the same solvents as those used in the sulfonated reaction solution. These include for example cyclohexane, methylcyclohexane, and heptane. Additional suitable additives known to those skilled in the art can be included in the desiccants composition which include but are not limited to, pore clearing agents, pH adjusting agents, surfactants, antifungal and/or antibacterial agents, hydrothermal stabilizers, flame retardants, smoke suppressants.

For example, the sulfonated block copolymer after sulfonation can be kept in the sulfonation reaction solution, and stored or shipped until admixed with other desiccants. Alternatively, the sulfonated block copolymer can be cast, or separated from its reaction solvent and formed into particle or pellets and re-dissolved in one or more of the aforementioned reaction solvents. The desiccants can be added to the sulfonated block copolymer solution to form a dispersion or colloid. The desiccants can be added in the form of a powder, granule, particle, or other solid form.

The desiccants can be added to the solution measured relative to the weight of the solution, for example, in some aspects, the desiccants can be added from at least 10%-wt., alternatively at least 25%-wt., alternatively at least 50%-wt., alternatively at least 100%-wt., alternatively at least 150%-wt., alternatively at least 200%-wt., alternatively at least 250%-wt., alternatively at least 300%-wt., alternatively at least 350%-wt., alternatively at least 400%-wt., alternatively at least 450%-wt., alternatively at least 460%-wt., alternatively at least 500%-wt., alternatively at least 550%-wt., or alternatively at least 600%-wt.

In other examples, the other desiccants can be added to the sulfonated block copolymer solution from 1%-wt. to 600%-wt., alternatively from 1%-wt. to 500%-wt., or alternatively from 1%-wt. to 460%-wt. or alternatively from 1%-wt. to 450%-wt., alternatively from 1%-wt. to 450%-wt., alternatively from 1%-wt. to 400%-wt. In other embodiments, the desiccants can be added from 5%-wt. to 600%-wt., alternatively from 10%-wt. to 600%-wt., alternatively, alternatively from 50%-wt. to 600%-wt., alternatively from 100%-wt. to 600%-wt., alternatively from 150%-wt. to 600%-wt., alternatively from 200%-wt. to 600%-wt. alternatively from 250%-wt. to 600%-wt., alternatively from 300%-wt. to 600%-wt., alternatively from 350%-wt. to 600%-wt., alternatively from 400%-wt. to 600%-wt., alternatively from 450%-wt. to 600%-wt., alternatively from 500%-wt. to 600%-wt., alternatively from 550%-wt. to 600%-wt. In other examples, the desiccants can be added to the sulfonated block copolymer solution from 1%-wt. to 600%-wt., alternatively from 50%-wt. to 550%-wt., alternatively from 100%-wt. to 500%-wt., alternatively from 150%-wt. to 450%-wt., alternatively from 200%-wt. to 400%-wt. It will be understood that any combination of the aforementioned ranges can be employed. The desiccant can be added in a low enough amount as to permit formation of a film or membrane upon casting.

The desiccants can be stirred in until evenly dispersed throughout the media. The mixing can be conducted at room temperature and atmosphere. A fraction of the desiccants may dissolve or a substantial portion or all may dissolve depending on the type of desiccant and solvent. For example, if solvent is one which solvates the desiccant then the desiccant may dissolve therein.

In one example silica gel can be added to a sulfonated block copolymer solution. The solution can comprise cyclohexane and sulfonated block copolymer up from 1%-wt. to about 30%-wt. The silica gel can be added up to from 200%-wt. to 500%-wt. of the solution for example.

The drawbacks of desiccants other than sulfonated block copolymers have been the presence of odor, or the occurrence of dust. The production of dust can result in health issues and furthermore odor can affect the commercial viability. However, surprisingly, when these desiccants are added to the sulfonated block copolymer, odor and dust is reduced or removed, thereby resulting in an advantageous desiccant composition.

After addition of the desiccant to the sulfonated block copolymer solution, the solution can be cast to a membrane or coated onto a substrate.

Bonding to Substrate

The manner in which the desiccant composition disclosed herein is bonded to the substrate depends on the composition and nature of the substrate. In some examples, the desiccant composition disclosed herein can be bonded to plastics and non-metal materials as substrates. With such materials, bonding can be carried out by coating or laminating the substrate with the desiccant composition. Lamination can be carried out by a variety of methods including, thermal, adhesive, solvent, or water lamination. Coating can be carried out optionally with the addition of binders or adhesives to assist bonding. The substrates can be porous or non-porous.

Lamination can be conducted with such plastic and non-metal substrates, however the effectiveness of water lamination can be affected by the polarity of the material. Accordingly, with respect to plastics or other non-metal materials, these can be divided into polar and non-polar plastics or other materials. Employing water lamination with such materials, the polar materials can generally form a strong bond, however, non-polar bonds may form weaker bonds or can delaminate.

Non-polar substrates can include for example, polyethylene (PE) and polypropylene (PP) for instance, or plastics formed from monomers which are not functionalized with a heteroatom or other group causing polarity. Additionally, some polar substrates may have a protective non-polar or hydrophobic coating thereon from a vendor due to manufacturing process.

Polar groups include oxygen containing groups such as hydroxyl groups, carboxyl groups, carbonyl groups, or ether groups. Additionally, polar groups include nitrogen containing groups such as amine, nitrile, sulfonamide or amide groups as well as halogens, including chlorine, fluorine, bromine and iodine. For polymeric substrates, the polar groups or atoms may be part of the main chain or extend therefrom.

Further substrates include polymeric substrates having polar linkages in the main chain and/or polar substituents extending from the main chain, such as acrylates, methacrylates, polymethylmethacrylate (PMMA), polyacrylonitriles, polyacrylamides, polyethers, polyesters, polyethylene terephthalate (PET), polyvinyl acetate (PVA), polyvinyl chloride (PVC), polyamines, polyamides, nylon, styrene acrylonitrile polymer (SAN), epoxides, acrylonitrile-butadiene-styrene (ABS), polycarbonates, and the like.

Polystyrene can be considered a polar substrate, however, water lamination can lead to poor bonding. Accordingly, in order to provide a strong bond, polystyrene can be laminated by heat or adhesives, or alternatively can be coated by the desiccant composition.

Fiberglass can also serve as a plastic substrate. Fiberglass is a plastic reinforced with glass fibers, and thus for purposes of the present disclosure can be considered a plastic or a composite substrate. The plastic used can be those mentioned herein, with exemplary plastics including epoxy, polyester, vinylester or a thermoplastic.

Additional materials which can serve as a substrate include glass, silica, concrete, ceramics, paper and other cellulosic materials, various metal oxides, oxidized carbon, genuine and synthetic leather, animal skins, and the like.

The surface of the substrates can affect the ability of the water lamination to produce a strong bond. For example, a roughened surface may interfere with water lamination bond. Additionally, and as mentioned, a treated surface can affect the polarity. For example, a non-polar or hydrophobic coating, such as a wax may affect lamination.

In addition to plastics, substrates can include metals. These can include alkali metals, alkaline earth metals transition metals or metals in the periodic table. The metals employed can be employed alone or as an alloy or as a composite with non-metal materials. For example, metals in groups 2 through 13 of the periodic table including metals those in rows 2-4 of the periodic table can be used as a substrate. In particular, metals Al, Cu, Ti, and Zn can be used, and in particular Al.

In some embodiments, the metals to be employed include those which have a tendency to interact directly with the sulfonic functional groups of the sulfonated block copolymer membrane. In such embodiments, the preferred metals are those which are highly active, are strong reducing agents and which are more likely to react with acids. Accordingly such metals are high in the so called Activity Series of elements. Specifically such metals include Li, K, Ba, Ca, Na, Mg, Al, Zn, Cr, Fe, Cd, Co, Ni, Sn, and Pb with the first mentioned metals being the highest in activity and each succeeding metal being less active. Care must be exercised in handling metallic Li, K, Ba, Ca, Na, and Mg as these metals can spontaneously ignite in the presence of air. The activate metals can be used alone or in combination with metals such as alloys or in composites containing non-metals. The most preferred metal for use in accordance with the present disclosure being Al due not only to its high activity but also its broad use across many applications.

The desiccant composition disclosed herein can be laminated or coated on metal substrates. Notably however, metal substrates employing lamination can result in the strongest bonds, including thermal, adhesive, solvent, or water lamination. In particular, water lamination can be employed, resulting in an easy application of a desiccant composition film. With respect to coating metal substrates, bonding may not occur, or if bonding does occur weaker bonds may result. Accordingly, when coating metal substrates, additional components must be added, for example binders, adhesives or other components for causing bonding to the surface of the metal substrate.

Regarding lamination, with whatever substrate, the desiccant composition is first formed into a membrane or film, for example via methods disclosed herein and then joined with the substrate to form a laminated substrate. There are a number of methods for laminating the desiccant composition. For example, lamination can be conducted by heat (thermal) lamination, adhesive, solvent, or water lamination. Additionally, sonic bonding may be employed for lamination.

Heat lamination is carried out by contacting the polymeric film with the porous substrate under temperature and pressure thereby forming a bond between the two. The lamination can take place in a vessel such as an oven or other machine or apparatus which enables pressing of the polymeric film and porous substrate together. Generally the temperature ranges from 95° to 450° F., and the pressure can have a range from 100 to 7,000 psi. Residence time, or time subjected to the increased temperature and pressure can be from 30 seconds to 10 minutes. Thereafter, the membrane can be cooled at room temperature at atmospheric pressure to produce the finalized membrane. Various types of laminating assemblies known in the art can be employed to contact the polymeric film and substrate under heat and pressure. Adhesives may also be used in heat lamination processes. Further, heat activated adhesives may be employed. Thermal lamination can be carried out by use of a press, which has two flat metal platens which can be drawn together. Alternatively, a more commercially viable method is via the use of roller assemblies. The roller assemblies can provide the desiccant composition film and substrate into rollers which join the two materials together to laminate the film onto the substrate. The roller assemblies can be heated for thermal lamination.

Another method for lamination is adhesive lamination, which generally utilizes wet or dry adhesives. Adhesive lamination is carried out by applying adhesive to one side of the desiccant composition film and then contacting it with a substrate. For example, the adhesive can be applied across the surface of either the desiccant film or the substrate or in particular areas. Commercially available double sided tapes can be employed as well. The adhesive employed can be for example acrylic, urethane or latex based. Exemplary tapes can have a service temperature of about −40~70° C. Furthermore, exemplary tapes include those that conform to UL standards for example, UL 723. Additionally, exemplary tapes include those that produce low amounts of volatile organic compounds (VOCs).

An additional method of lamination is termed solvent lamination. In this type of lamination, an organic solvent is applied to the sulfonated block copolymer film. The portion of the sulfonated polymer film contacted with the solvent accordingly softens. The film is then pressed onto the substrate thereby forming a bond between the portions softened by the organic solvent and the substrate. Organic solvents may be used which have the effect of solvating portions of the polymeric film. Such organic solvents include alcohols, alkyls, ketones, acetates, ethers, and aromatic solvents, such as toluene and benzene. This can be done under heat or at room temperature.

"Water lamination" as used herein is where water is employed as the solvent or as softening liquid. Water as the preferred solvent can be employed alone or in combination with minor amounts of other solvents added thereto. Water for use as a solvent may include minor amounts of impurities and accordingly typical tap water is sufficient. However, the water source includes spring, distilled, purified, filtered or deionized or other forms of treated or untreated water. Even with minor amounts of other impurities as those typically found in natural water such as salts, sodium or potassium salts, chlorine or various metal ions water can be successfully employed for lamination as disclosed herein. The water should be sufficiently clean such that any impurities do not interfere with the interaction with the film or sulfonic functionalities.

Additionally, the water may have other polar solvents added thereto. Additional polar solvents include those which do not degrade the membrane or substantially interfere with the intrinsic properties of the membrane upon drying (such as moisture vapor transmission rate "MVTR"). Polar solvents include alcohols, diols, esters, ethers, ketones, aldehydes, esters of carboxylic acids, acrylates and contain from 1 to 20 carbon atoms, preferably from 1 to 8 carbon atoms, preferably from 1 to 4 carbon atoms, and can be linear, branched, cyclic, aliphatic or aromatic. Preferably, any additional solvents are miscible with water. It will be understood that high levels of water concentration should be used to avoid wrinkled or hazy film and potential delamination in the presence of water.

The film may be exposed to the solvent by conventional methods known in the art. One method includes a bath, where the solvent is poured into a container and the film is soaked in the solvent. The film can be soaked in the bath for from a few seconds to 100 hours until the film is sufficiently hydrated. At the least, the film can be fully hydrated after 24 hours of soaking in a water bath. The time period to reach full hydration depends on factors such as the thickness of the film. Furthermore, the point at which the film is fully hydrated is also the point at which equilibrium is reached.

Other methods may include spraying the film with water or subjecting the film to water vapor by means of jets or mists. Further methods may also be providing the film in moist or humid air for sufficient periods to partially or fully hydrate the film, or use of a squeegee. In these ways water may be adsorbed into the film.

In some embodiments, the film will be fully (i.e. 100%) hydrated with solvent. In order for the film to be successfully laminated to the polar or active metal substrate it is not required that the film be fully hydrated. The film should be sufficiently wetted such that the film interacts with the polar or active metal substrate to form a bond upon drying. In some embodiments, the film may be partially hydrated. For example, in some embodiments, the film may be at least 25% hydrated, alternatively at least 30% hydrated, alternatively at least 50% hydrated, alternatively at least 60% hydrated, alternatively at least 75% hydrated, alternatively at least 90% hydrated.

After applying the film to the substrate, it is left to dry. The amount of time for drying is dependent on the type and amount of solvent, temperature, and humidity of the air and therefore can be from about 1 minute to 24 hours or more. Warm dry air can used to speed drying. As discussed above, as the film dries it forms bonds to the surface of the substrate.

Alternatively to lamination, the desiccant composition can be applied via coating process. Similar to solution coating, the desiccant composition is applied in liquid form onto the substrate, and then allowed to dry. The desiccant composition can be applied in the same solution in which the sulfonation reaction occurred. Alternatively, the sulfonated block copolymer can be cast or pelletized and re-dissolved in the same solvents noted above with respect to the sulfonation reaction. In either case, additional desiccants can be added to the sulfonated block composition as discussed above and applied to the substrate.

After applying the desiccant composition to the substrate, the composition can be left to dry, whereby bonds are formed to the substrate. Drying can be conducted in room temperature and atmosphere.

Application

The rotary enthalpy exchange wheel having the desiccant composition as disclosed herein can be employed for improved exchange of moisture between air streams. The desiccant composition causes more rapid adsorption and desorption of water from air than conventional desiccants. In particular, the desiccant composition has a higher water uptake value in shorter periods of time than conventional desiccants.

In one example, the rapid sorption and desorption is a result of differences in water uptake values depending on relative humidity of air streams. For example, referring to FIG. 2, the exiting air stream 190 can be warmer and have higher moisture content. Whereas entering airstream 195 can be cooler and have lower moisture content.

In some examples, the property of moisture exchange can vary depending on the substrate. Moreover, the relative humidity can affect the activity of the desiccant composition. For example, aluminum substrate can demonstrate high water uptake values at high relative humidity and lower uptake values at lower relative humidity (RH). This way water can easily be sorbed in high humidity air streams and then desorbed in low RH air streams releasing air.

For example, when the desiccant composition is laminated onto metal or aluminum substrates, the desiccant composition can have a change in water uptake during sorption or desorption of at least about 3% at 10% RH, at least about 7% at 20% RH, at least about 9% at 30% RH, at least about 11% at 40% RH, at least about 15% at 50% RH, at least about 20% at 60% RH, at least about 20%, or alternatively, at least about 25% at about 70% RH, at least about 30%, or alternatively, at least about 35% at 80% RH, at least about 40%, or alternatively, at least about 42% at 85% RH, at least about 50%, or alternatively, at least about 52% at 90% RH, at least about 55%, or alternatively, at least about 60% at 95% RH. Additionally, in some embodiments there is a difference in water uptake of at least about 40% when RH is changed between 10% and 90% RH after equilibrium is reached. Such a difference reflects a large degree of moisture transfer between air streams, for example if an entering air stream is 10% RH and an exiting air stream is 90% RH, or vice versa. In other embodiments, there is a difference in water uptake of at least 20 to 25%, or alternatively 30% to 35% when RH is changed between 20% and 80% RH after equilibrium is reached.

When laminated on plastic or non-metal substrates, the desiccant composition can have a change in water uptake during sorption or desorption of at least about 2-4% at 10% RH, at least about 4-7% at 20% RH, at least about 7-9% at 30% RH, at least about 10-12% at 40% RH, at least about 13-15% at 50% RH, at least about 15%, or alternatively at least 19-21% at 60% RH, at least about 20%, or alternatively at least about 23-26% at about 70% RH, at least about 30%, or alternatively at least 34-36% at 80% RH, at least about 35%, or alternatively at least 41-43% at 85% RH, at least about 45%, or alternatively at least 50-52% at 90% RH, at least about 55%, or at least about 60-62% at 95% RH. Additionally, in some embodiments there is a difference in water uptake of at least about 40-45% when RH is changed between 10% and 90% RH after equilibrium is reached. In other embodiments, there is a difference in water uptake of at least 20%, 25%, 30% or 35% when RH is changed between 20% and 80% RH after equilibrium is reached.

For plastic or non-metal substrates where the desiccant composition is coated thereon, the desiccant composition can have a change in water uptake during sorption or desorption of at least about 2-4% at 10% RH, at least about 4-6% at 20% RH, at least about 5-6% at 30% RH, at least about 7-9% at 40% RH, at least about 9-11% at 50% RH, at least about 12-14% at 60% RH, at least about 16-18% at about 70% RH, at least about 21-24% at 80% RH, at least about 29-31% at 85% RH, at least about 35-37% at 90% RH, at least about 42-44% at 95% RH. Additionally, in some embodiments there is a difference in water uptake of at least about 30%, 35%, or 40% when RH is changed between 10% and 90% RH after equilibrium is reached. In other embodiments, there is a difference in water uptake of at least 15%, 20% or 25% when RH is changed between 20% and 80% RH after equilibrium is reached.

For plastic or non-metal substrates where the desiccant composition is a mixture of sulfonated block copolymer and at least one other desiccant, such as silica gel, and coated on a plastic such as oriented polystyrene, the desiccant composition can have a change in water uptake during sorption or desorption of at least about 2-4% at 10% RH, at least about 4-6% at 20% RH, at least about 5-8% at 30% RH, at least about 10-12% at 40% RH, at least about 13-17% at 50% RH, at least about 16-19% at 60% RH, at least about 18-20% at about 70% RH, at least about 19-22% at 80% RH, at least about 20-22% at 85% RH, at least about 31-24% at 90% RH, at least about 24-26% at 95% RH. Additionally, in some embodiments there is a difference in water uptake of at least about 15%, or 20%, when RH is changed between 10% and 90% RH after equilibrium is reached. In other embodiments, there is a difference in water uptake of at least 10% or 15% when RH is changed between 20% and 80% RH after equilibrium is reached.

Accordingly, by having such high sorption in higher humidity air streams, and the tendency to desorb in lower humidity air streams, the bonded desiccant compositions as disclosed herein provide advantageous moisture or enthalpy exchange between air streams.

ILLUSTRATIVE EMBODIMENTS

The following examples are intended to be illustrative only, and are not intended to be, nor should they be construed as, limiting the scope of the disclosure.

a. Materials and Methods

Degree of Sulfonation: The degree of sulfonation as described herein and as determined by titration was measured by the following potentiometric titration procedure. The sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by $^1$H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-d8 (THF-d8), to which was then added with a partial drop of concentrated sulfuric acid to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

b. Experiments

Preparation of Sulfonated Block Copolymer SBC-1

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert-butylstyrene monomer was added, and polymerization thereof was terminated by adding methanol to obtain a ptBS block having a molecular weight of about 14,000 g/mol. The ptBS-Ip-S-Ip-ptBS was then hydrogenated using a standard $CO_2$+/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol i-butyric anhydride) The resulting polymer was found, by potentiometric titration, to have an "Ion Exchange Capacity (IEC)" of 2.0 meq of —$SO_3H$/g of polymer. The solution of sulfonated polymer had a solids level of about 10% wt./wt. in a mixture of heptane, cyclohexane, and ethyl i-butyrate. The solution was then coated onto a PET release liner through the use of a slot die. In such case, the coating moves through slot die head to a zoned heating oven where the solvent is removed. The cast film was then resolvated in toluene/n-propanol mixture solvent (mixing ratio: 1:1%-wt.) with a resultant solids of 14~15%-wt.

Films of the compositions prepared as described above were either coated onto a substrate (direct coating) or cast to a film against siliconized glass plates at room temperature in a box with a nitrogen purge. Films were allowed to dry in this manner for a period of at least 16 hours. No further post-treatments of the film were performed except those specifically required by particular testing procedures. Typical film thicknesses obtained by this procedure range from 0.25 to 2.0 mils.

Example 1

Figure 4:
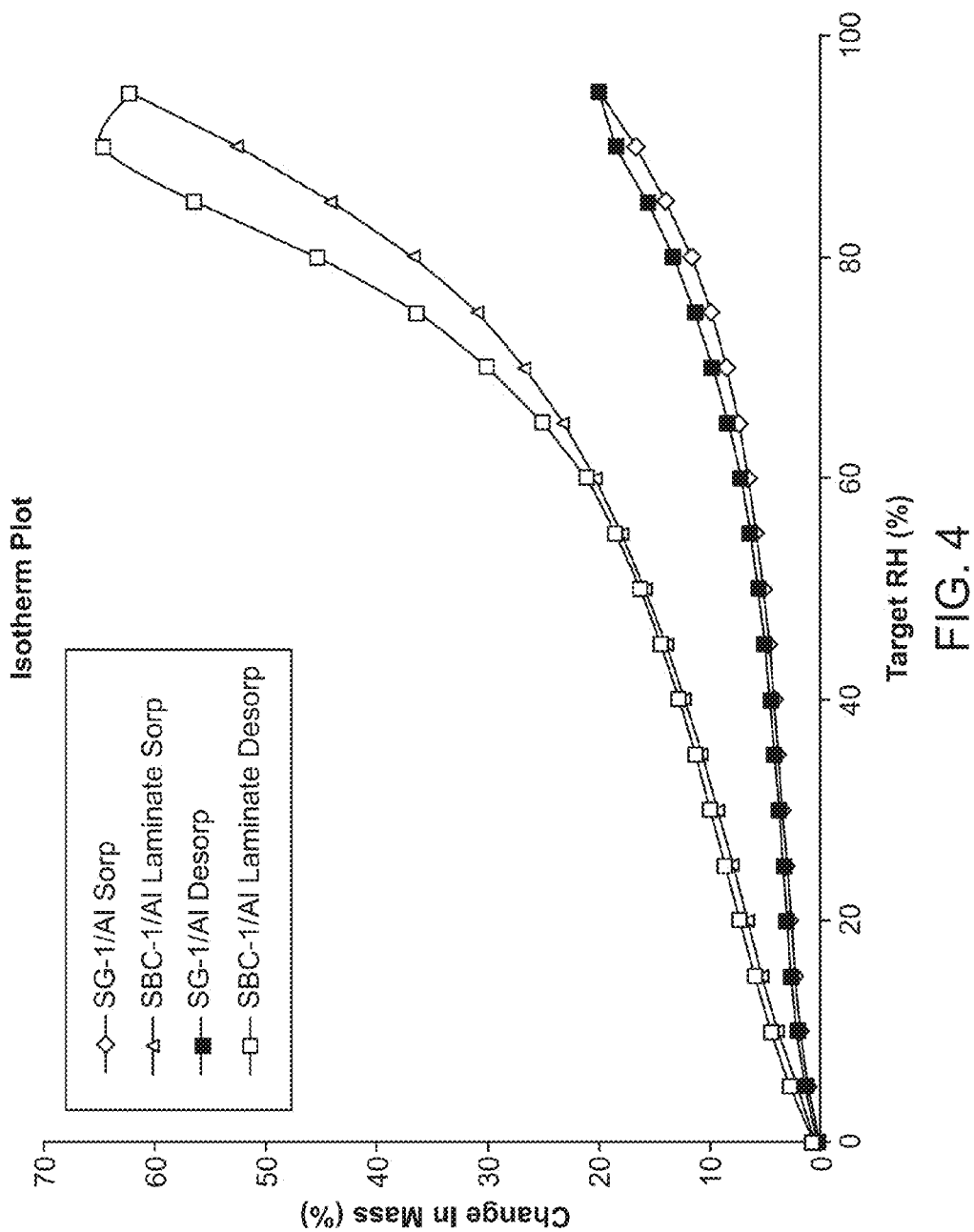
FIG. 4 is an isotherm graph illustrating water uptake as a function of relative humidity samples bonded to an aluminum substrate.

SBC-1 was cast to a film having a thickness of 0.5 mil and then adhesively laminated to both sides of an aluminum substrate, entitled "SBC-1/Al" in FIG. 4. As used in the examples herein, adhesive lamination refers to bonding the film to the substrate with a double sided tape having an acrylic adhesive. As a comparison, an aluminum foil substrate was coated on both sides with silica gel ("SG-1"), entitled "SG-1/Al" in FIG. 4.

The SBC-1 Al laminate substrate and the SG-1 coated aluminum substrate were then subject to a sorption and desorption cycle with results shown in FIG. 4, noted therein as "Sorp" or "Desorp", respectively. Each cycle consisted of increasing RH by 5% increments from zero to about 95%. With each increment the two samples were allowed to equilibrate, and then the change in mass measured to determine water uptake.

As shown in FIG. 4, the SBC-1 Al laminate demonstrated much higher water uptake than the SG-1 coated aluminum substrate across the entire range of RH. Further, the difference in the amount of water uptake increased non-linearly as RH increased, with water uptake increasing at greater rates at higher RH, demonstrating approximate exponential growth. The SBC-1 samples showed no occurrence of dusting or the presence of any odor.

As a result of such advantageous results, when employed in a rotary enthalpy exchange wheel exchange, the SBC-1 Al laminate would provide greater exchange of moisture between air streams than conventional systems. For example, an exiting air stream having high humidity would sorb a larger degree of moisture, and then desorb into the entering air stream thereby providing a high degree of exchange.

Example 2

Figure 5:
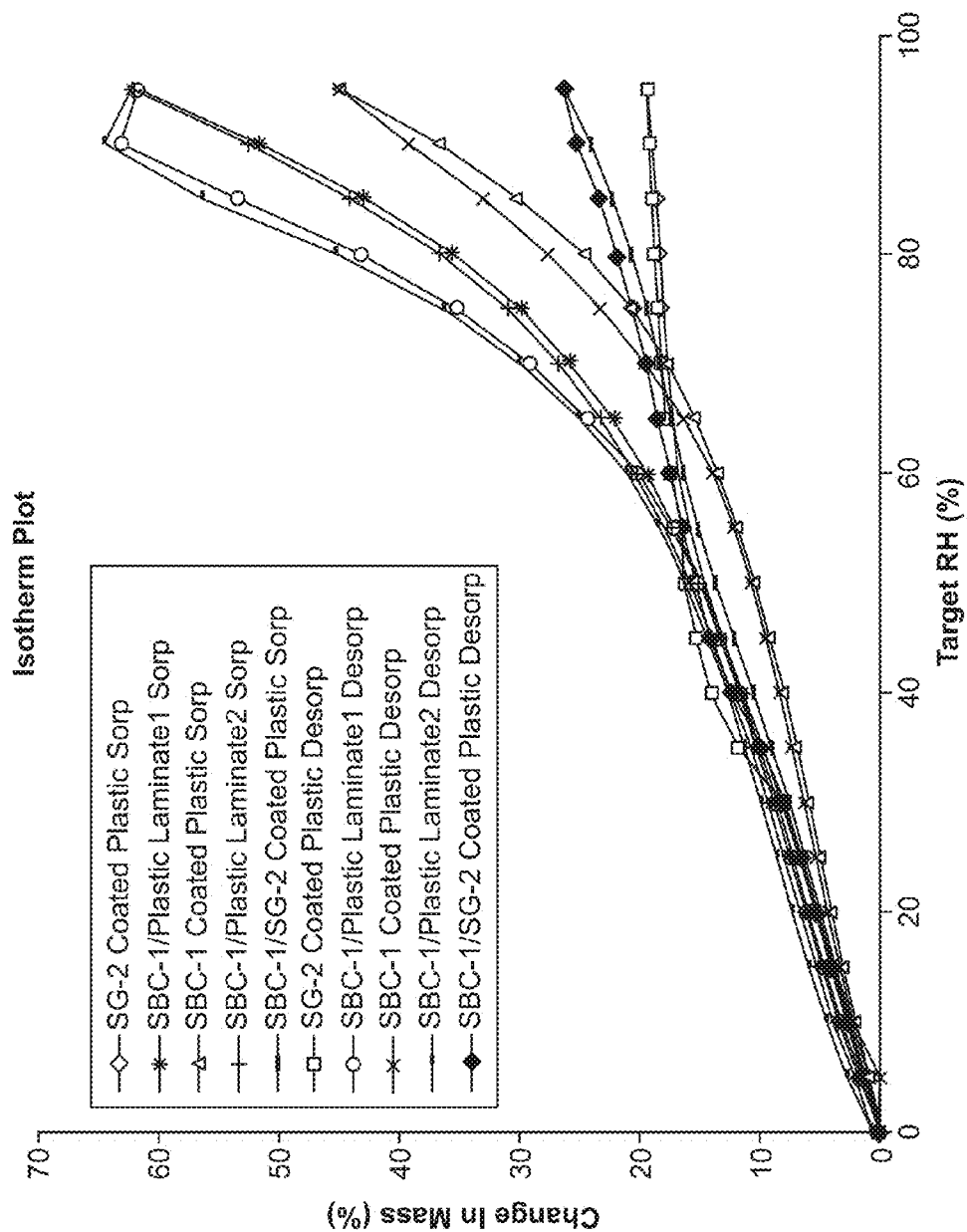
FIG. 5 is an isotherm graph illustrating water uptake as a function of relative humidity samples bonded to a plastic substrate.

For example 2, SBC-1 was cast to a film having a thickness of 0.5 mil and then adhesively laminated to both sides of an oriented polystyrene as a substrate, entitled "SBC-1/Plastic Laminate1" in FIG. 5. A second adhesive laminate of SBC-1 film on a polystyrene substrate with the same adhesive was made entitled "SBC-1/Plastic Laminate2" in FIG. 5. Moreover, for "SBC-1 Coated Plastic" in FIG. 5, the SBC-1, rather than casting to a film, was direct coated onto both sides of an oriented polystyrene substrate, entitled "SBC-1 Coated Plastic." As an additional comparison, SBC-1, after being removed from the reactor and stored, was mixed with SG-2 to 460%-wt. and then coated on to an oriented polystyrene. This sample is entitled "SBC-1/SG-2 Coated Plastic" in FIG. 5. As a comparative example to the SBC-1 containing desiccant compositions, oriented polystyrene was coated with a SG-2, entitled "SG-2 Coated Plastic" in FIG. 5. SG-2 is a Type A silica gel having a nominal 22 Å pore size. Each of the samples were subject to a sorption and de-sorption cycle with results shown in FIG. 5, noted therein as "Sorp" or "Desorp", respectively. Each cycle consisted of increasing RH from zero at about 5% increments of up to a RH of about 95%. At each increment the samples were allowed to equilibrate, and then the change in mass measured for water uptake. Two cycles were conducted to test redundancy of results.

As shown in FIG. 5, the SBC-1 containing desiccant compositions outperformed the SG-2 sample. Specifically, the SBC-1 laminates had higher water uptake throughout the range at 50% RH and above than the SG-2 sample. The coated SBC-1 sample demonstrated higher water uptake at ranges above approximately 70% RH. Surprisingly, for each of the samples containing only SBC-1, namely, the SBC-1 laminate and coated samples, the difference in the amount of water uptake increased non-linearly as RH increased, with water uptake increasing at greater rates at higher RH, demonstrating approximate exponential growth. Therefore, there was a more than 35-40% difference in water uptake at RH of 90% or more, and at least 20-25% at RH of 80%. Surprisingly, the mixed SBC-1/SG-2 composition showed higher water uptake than the SG-2 sample above 60% RH.

With such great increases in water uptake at the higher RH values while having low water uptake at low RH values, the SBC-1 containing desiccant compositions would have superior water transfer between air streams in a rotary enthalpy exchange wheel over conventional desiccants.

Example 3

FIGS. 6A through 6D demonstrate the advantages of the desiccant compositions of the present disclosure over conventional compositions with respect to microparticle shedding, referred to herein as dusting. In particular, 1 ft.×3 inch samples were prepared made up of (a) SG-1 coated on oriented polystyrene ("PS"), (b) SG-2 coated Al, (c) molecular sieve coated Al, and (d) a mix of SBC-1 and SG-1 ("SBC-1/SG-1") coated on PS. These samples were then placed in controlled atmosphere of 68° F., 50% RH for 24 hours.

Thereafter, carbon tape was placed on each sample with minimal pressure. Any dust particles which might have developed on the surfaces would then be trapped beneath the carbon tape when applied thereon. The samples (a)-(d) were then viewed with a scanning electron (SEM) microscope, the results of which are shown in FIGS. 6A through 6D, respectively.

Figure 6A:
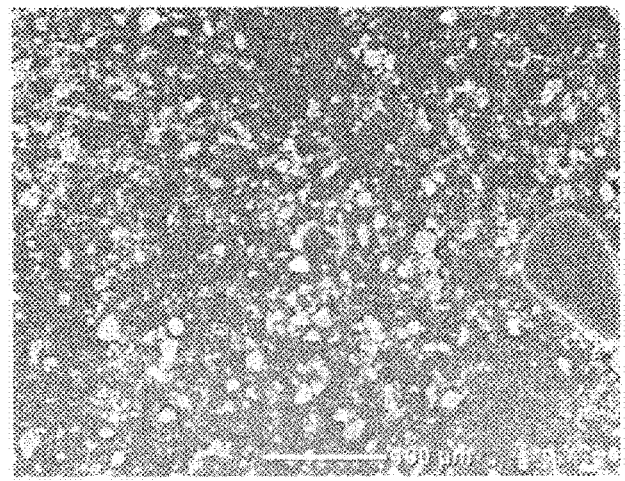
FIG. 6A is an scanning electron microscope (SEM) image of a desiccant silica gel, SG-1 (defined further below), coated on oriented polystyrene substrate.
Figure 6B:
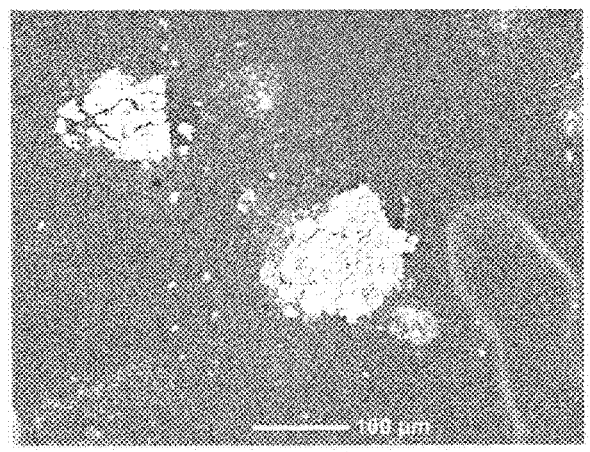
FIG. 6B is an scanning electron microscope (SEM) image of a desiccant silica gel, SG-2 (defined further below), coated on an aluminum substrate.
Figure 6C:
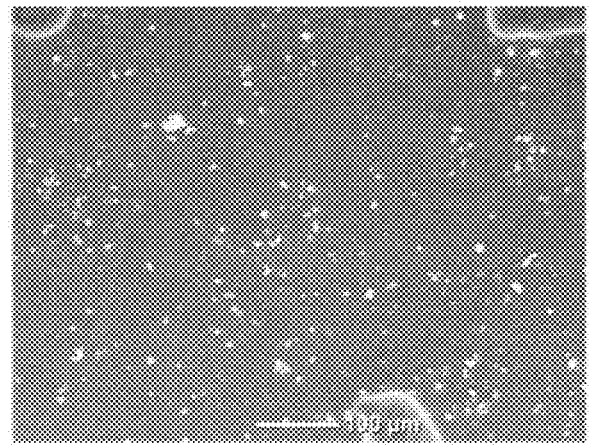
FIG. 6C is an scanning electron microscope (SEM) image of a molecular sieve desiccant coated on an aluminum substrate.
Figure 6D:
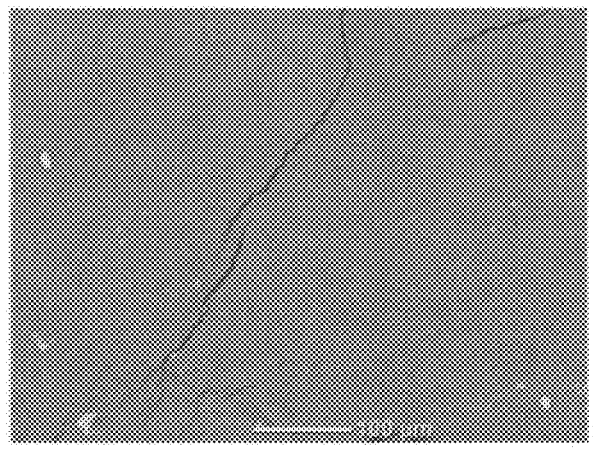
FIG. 6D is an scanning electron microscope (SEM) image of a desiccant mixture made up of a sulfonated block copolymer and silica gel, SBC-1/SG-1 (defined further below) coated on oriented polystyrene.

As shown in FIG. 6A the SG-1 coated PS produced the largest spread of dust, whereas in FIG. 6B, SG-2 coated on Al showed large conglomerations. In FIG. 6C having the molecular sieve coated Al sample showed the collection of dust across the surface but to a lesser extent than that in FIG. 6A. However, surprisingly, as can be seen in the SEM FIG. 6D, the SBC-1/SG-1 coated on PS has very little particle shedding as compared to the other three commercially available wheel samples (a)-(c).

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A rotary enthalpy exchange wheel comprising:
a rotatable wheel having air passageways extending from a front side to a back side for passing air streams therethrough, said wheel comprising a rigid plastic substrate, the rigid plastic substrate coated or laminated with a desiccant composition comprising a sulfonated block copolymer and a second desiccant other than a sulfonated block copolymer,
wherein the sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

2. The rotary enthalpy exchange wheel of claim 1, wherein the desiccant composition is laminated on the substrate.

3. The rotary enthalpy exchange wheel of claim 1, wherein the desiccant composition is adhesively laminated on the substrate.

4. The rotary enthalpy exchange wheel of claim 3, wherein the water uptake of the desiccant composition increases at least 20% when the relative humidity is changed from 20% and 80%.

5. The rotary enthalpy exchange wheel of claim 3, wherein the water uptake of the desiccant composition as a result of water sorption is at least 30% when the relative humidity of an air stream has a relative humidity above 80%.

6. The rotary enthalpy exchange wheel of claim 1, wherein the wheel is substantially circular having a plurality of separated sections, wherein the passageways are oriented to permit air stream flow in opposite directions between at least two of the sections without substantial intermixture.

7. The rotary enthalpy exchange wheel of claim 1, wherein the rigid plastic forms a matrix within the rotatable wheel.

8. The rotary enthalpy exchange wheel of claim 1, wherein the wheel rotates about a hub.

9. The rotary enthalpy exchange wheel of claim 1, wherein the plastic substrate is made up of polystyrene, polyethylene, polypropylene, polyester, nylon, or a mixture thereof.

10. A rotary enthalpy exchange wheel comprising:
a rotatable wheel having air passageways extending from a front side to a back side for passing air streams therethrough, said wheel comprising a rigid substrate, the rigid substrate coated or laminated with a desiccant composition comprising a sulfonated block copolymer and a second desiccant other than a sulfonated block copolymer,
wherein the sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

11. The rotary enthalpy exchange wheel of claim 10, wherein the second desiccant is selected from zeolites, molecular sieves, silica gel, lithium chloride, or a mixture thereof.

12. The rotary enthalpy exchange wheel of claim 11, wherein the second desiccant is silica gel.

13. The rotary enthalpy exchange wheel of claim 10, wherein the second desiccant is an inorganic desiccant.

14. The rotary enthalpy exchange wheel of claim 10, wherein the rigid substrate comprises a metal, a plastic, or a composite material.

15. The rotary enthalpy exchange wheel of claim 10, wherein the rigid substrate is aluminum.

16. The rotary enthalpy exchange wheel of claim 10, wherein the desiccant composition is laminated on the substrate.

17. The rotary enthalpy exchange wheel of claim 10, wherein the desiccant composition is adhesively laminated on the substrate.

18. The rotary enthalpy exchange wheel of claim 10, wherein the water uptake of the desiccant composition increases at least 10% when the relative humidity is changed from 20% and 80%.

19. The rotary enthalpy exchange wheel of claim 10, wherein the water uptake of the desiccant composition is at least 19% when the relative humidity of an air stream has a relative humidity at 80% and above.

20. The rotary enthalpy exchange wheel of claim 10, wherein the wheel is substantially circular having a plurality of separated sections, wherein the passageways are oriented to permit air stream flow in opposite directions between at least two of the sections without substantial intermixture.

21. The rotary enthalpy exchange wheel of claim 10, wherein the rigid substrate is plastic.

22. The rotary enthalpy exchange wheel of claim 10, wherein the wheel rotates about a hub.

23. The rotary enthalpy exchange wheel of claim 10, wherein the plastic substrate is made up of polystyrene, polyethylene, polypropylene, polyester, nylon, or a mixture thereof.

24. A desiccant composition for a rotary enthalpy exchange wheel exchanger comprising:
a sulfonated block copolymer comprising at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units,
the sulfonated block copolymer mixed with a second desiccant different from said sulfonated block copolymer,
wherein the desiccant composition is coated or laminated on a rotary enthalpy exchange wheel.

25. The desiccant composition of claim 24, wherein the second desiccant is selected from zeolites, molecular sieves, silica gel, lithium chloride, or a mixture of such.

26. The desiccant composition of claim 25, wherein the second desiccant is silica gel.

27. The desiccant composition of claim 24, wherein the second desiccant is an inorganic desiccant.

28. The desiccant composition of claim 24, wherein the second desiccant is an organic desiccant.

29. A rotary enthalpy exchange wheel comprising:
a rotatable wheel having air passageways extending from a front side to a back side for passing air streams therethrough, said wheel comprising a metal substrate, the metal substrate coated or laminated with a sulfonated block copolymer and a desiccant other than a sulfonated block copolymer, wherein the sulfonated block copolymer has at least one end block A and at least one interior block B, wherein each A block contains essentially no sulfonic acid or sulfonate ester functional groups and each B block is a polymer block containing from about 10 to about 100 mol percent sulfonic acid or sulfonate ester functional groups based on the number of monomer units.

30. The rotary enthalpy exchange wheel of claim 29, wherein the metal substrate is aluminum.

* * * * *